United States Patent

[11] 3,620,689

[72] Inventors John P. Faust
Hamden;
Albert W. Jache, North Haven; Andrew J.
Klanica, Cheshire, all of Conn.
[21] Appl. No. 482,329
[22] Filed Aug. 20, 1965
[45] Patented Nov. 16, 1971
[73] Assignee Olin Mathieson Chemical Corporation

[54] PREPARATION OF ALKALI METAL
HEXAFLUOROCHLORATES
3 Claims, No Drawings
[52] U.S. Cl. .................................................. 23/367,
23/88
[51] Int. Cl. ..................................................... C01c 7/24,
C01d 11/00

[50] Field of Search ............................................ 23/367, 88,
89

[56] References Cited
OTHER REFERENCES

Emeleus et al., Advances in Inorganic Chemistry, and Radiology, Vol. 3, 1961, page 139, QD1 A35

Primary Examiner—Leland A. Sebastian
Attorneys—Gordon D. Byrkit, Thomas P. O'Day, Richard Strickler and George J. Koeser CLAIM: Process for preparing alkali metal hexafluorochlorates having the formula $MClF_6$ where M is potassium, rubidium or cesium which comprises reacting MF with chlorine pentafluoride at about 0° to 150° C. and at autogenous pressure in a reaction zone defined by surfaces of nickel fluoride.

PREPARATION OF ALKALI METAL HEXAFLUOROCHLORATES

This invention relates to a novel method of preparing alkali metal hexafluorochlorates of the formula $MClF_6$ where M is potassium, rubidium or cesium.

According to U.S. Pat. No. 3,143,391 issued Aug. 4, 1964 to Hurley et al., assignors to Olin Mathieson Chemical Corporation, the alkali metal tetrafluorochlorates of the formula $MClF_4$ are prepared by the direct reaction of an alkali metal fluoride and chlorine trifluoride at temperatures of 50° to 150° C. and at autogenous pressures.

The process of U.S. Pat. No. 3,143,391 was repeated several times, substituting chlorine pentafluoride for chlorine trifluoride and otherwise observing all the conditions recited in the patent but no product of the formula $MClF_6$ was formed. The alkali metal tetrafluorochlorates were the only M–Cl–F products obtained. The expected reaction did not occur.

The method of the present invention comprises reacting an alkali metal fluoride of the formula MF, where M is potassium, rubidium or cesium with chlorine pentafluoride at temperatures between about 0° and 150° C. and at autogenous pressure in a reaction zone limited by, defined by, and lined with surfaces of nickel fluoride.

The reaction zone is suitably a container fabricated of nickel or alloys predominately of nickel, containing 50 percent or more of nickel, particularly Monel. The reaction zone takes the form of a tube, coil, bomb or other container. The container is provided with a surface of nickel fluoride by filling the container with a nickel-fluorinating agent, suitably elemental fluorine or a fluorine containing interhalogen compound, for example, chlorine trifluoride or chlorine pentafluoride, and heating the container, in contact with the halogen to a temperature above about 200° C., suitably about 300° C. for about 0.5 hour or longer.

The alkali metal fluoride and chlorine pentafluoride are introduced into the pretreated reaction zone and maintained at temperatures between 0° C. and 150° C., preferably between room temperature, about 20° C., and 100° C. Yields diminish at temperatures much below 0° C. or much above 150° C. Autogenous pressures are suitable. However, the reaction between the solid alkali metal halide and the gaseous or liquid chlorine pentafluoride is slow and a period of hours of contact is advisable. At least 8 hours is preferred and several days can be allowed when convenient. Suitable proportions of chlorine pentafluoride to alkali metal fluoride range from about 0.1:1 to 10:1 or more, preferably from about 1:1 to 6:1. The resulting alkali metal hexafluorochlorates are produced in admixture with the alkali metal fluoride and the alkali metal tetrafluorochlorate.

EXAMPLE I

A 150 ml. reactor made of nickel and equipped with a Monel valve was used for the reaction. It was pretreated by pressuring with fluorine at superatmospheric pressure and heating at 300° C. for 30 minutes to coat the metal surfaces interiorly with nickel fluoride.

Into the thus conditioned reactor was placed 1.9 g. (12.5 millimoles) of CsF. The reactor was then evacuated, cooled with liquid nitrogen to −196° C. and 4.8 g. (36.8 millimoles) of chlorine pentafluoride were condensed in. While the cylinder was still at this temperature 2.0 g. (105 millimoles) of fluorine were condensed in. The cylinder was closed, warmed to room temperature and then placed in an oil bath at 70° C. It was removed after 16 hours, the volatiles were pumped off and the solid was analyzed. The yield of $CsClF_6$ was 20.27 percent, balance $CsClF_4$ and CsF.

EXAMPLE II

A 150 ml. nickel cylinder having a Monel valve was filled with fluorine at superatmoshperic pressure and conditioned by heating for several hours at 300° C. The cylinder was charged with 2.0 g. (13.2 millimoles) of CsF, cooled with liquid nitrogen and 9.5 g. (72.8 millimoles) of chlorine pentafluoride was condensed in. The cylinder was closed and shaken occasionally while standing at room temperature for 3 days. At the end of this time, unreacted chlorine pentafluoride was pumped off and the white solid crystalline product was removed. Elemental analysis showed the following composition:

| | |
|---|---|
| CsF | 53.97% |
| $CsClF_6$ | 43.40 |
| $CsClF_4$ | 2.60 |

The product demonstrated strong oxidizing power when tested with aqueous potassium iodide.

EXAMPLE III

A 95 ml. Monel cylinder having a Monel valve was filled with gaseous chlorine monofluoride at superatmospheric pressure and conditioned by heating for 30 minutes at 300° C. The cylinder was charged with 1.9 g. (18.2 millimoles) of RbF and 8.57 g. (65.5 millimoles) of liquid chlorine pentafluoride. The cylinder was closed and heated to 70° C. for 10 days. At the end of this time, unreacted chlorine pentafluoride was pumped off and the white crystalline product was removed. Elemental analysis showed the following composition:

| | |
|---|---|
| RbF | 49.87% |
| $RbClF_6$ | 6.83 |
| $RbClF_4$ | 43.3 |

The product liberated iodine when tested with aqueous potassium iodide.

EXAMPLE IV

A 95 ml. Monel cylinder having a Monel valve was filled with gaseous chlorine monofluoride and conditioned by heating for 30 minutes at 300° C. The cylinder was charged with 2.0 g. (34.4 millimoles) of KF and 8.6 g. (65.8 millimoles) of chlorine pentafluoride. The cylinder was closed and heated at 70° C. for 8 days. At the end of this time, unreacted chlorine pentafluoride was pumped off and the white solid product was removed. Elemental analysis showed the following composition:

| | |
|---|---|
| KF | 46.99% |
| $KClF_6$ | 6.06 |
| $KClF_4$ | 49.95 |

The product liberated iodine with aqueous potassium iodide.

What is claimed is:

1. Process for preparing alkali metal hexafluorochlorates having the formula $MClF_6$ where M is potassium, rubidium or cesium which comprises reacting MF with chlorine pentafluoride at about 0° to 150° C. and at autogenous pressure in a reaction zone defined by surfaces of nickel fluoride.

2. Process of claim 1 in which said surfaces of nickel fluoride are formed by contacting surfaces of nickel with elemental fluorine at temperatures above about 200° C. for at least 0.5 hour.

3. Process of claim 1 in which the molar ratio of chlorine pentafluoride to MF is at least 0.1:1.

* * * * *